Feb. 19, 1957  J. E. FILLINGAME  2,781,690
FILM BOX FOR PHOTOGRAPHIC CAMERAS
Filed April 29, 1954  6 Sheets-Sheet 1
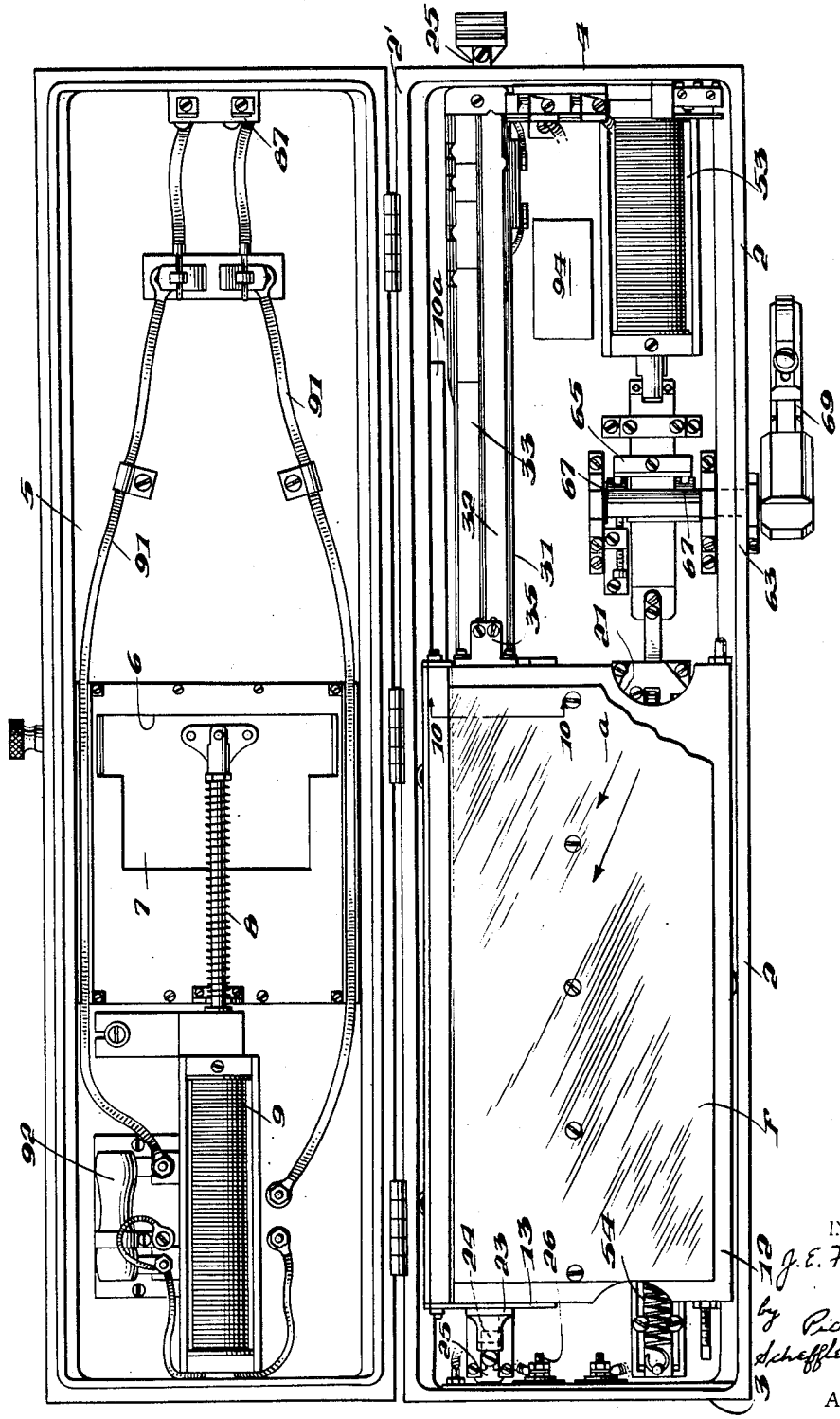
INVENTOR:-
J. E. Fillingame,
by Pierce,
Scheffler-Parker,
ATTORNEYS.

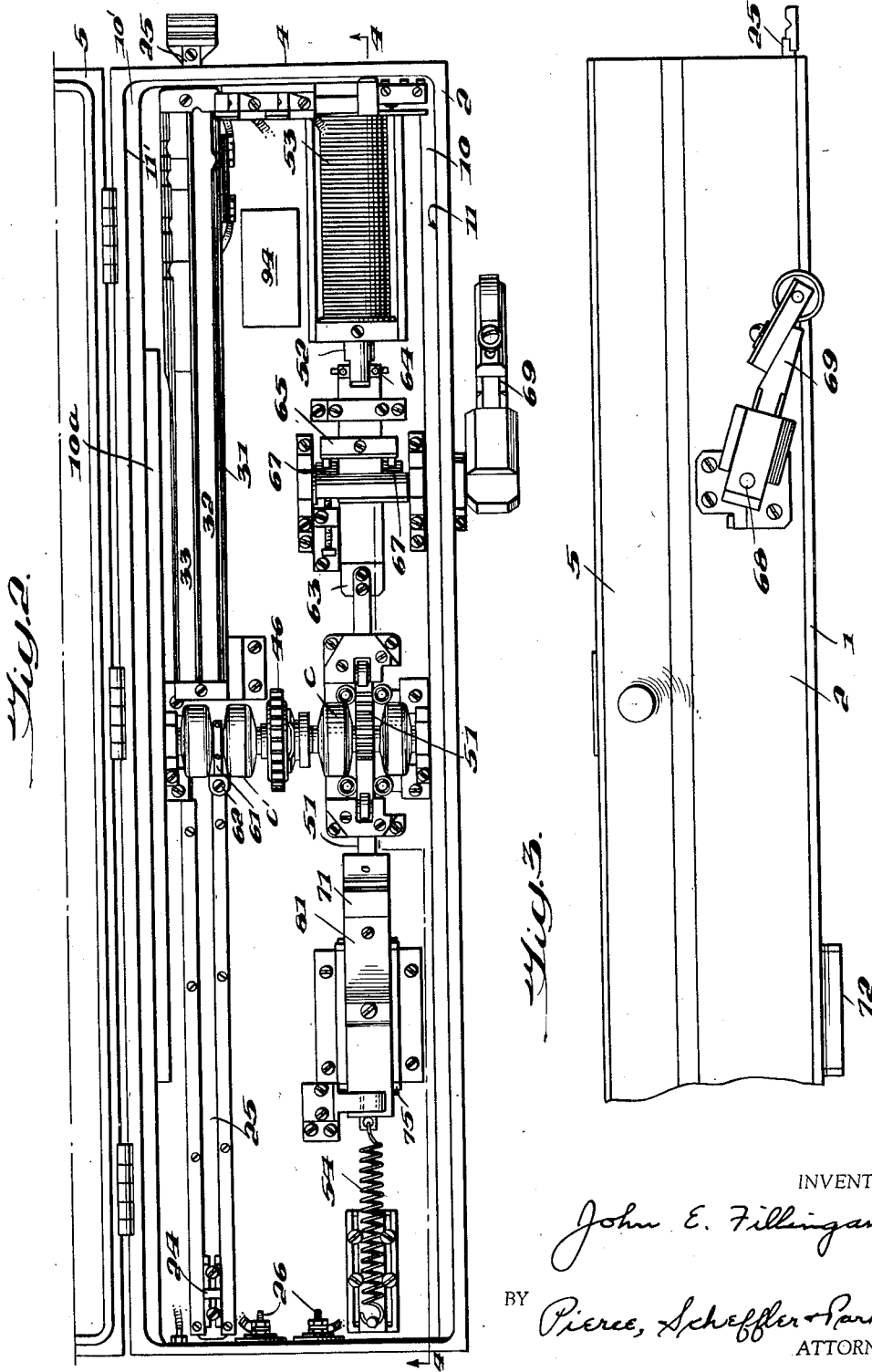

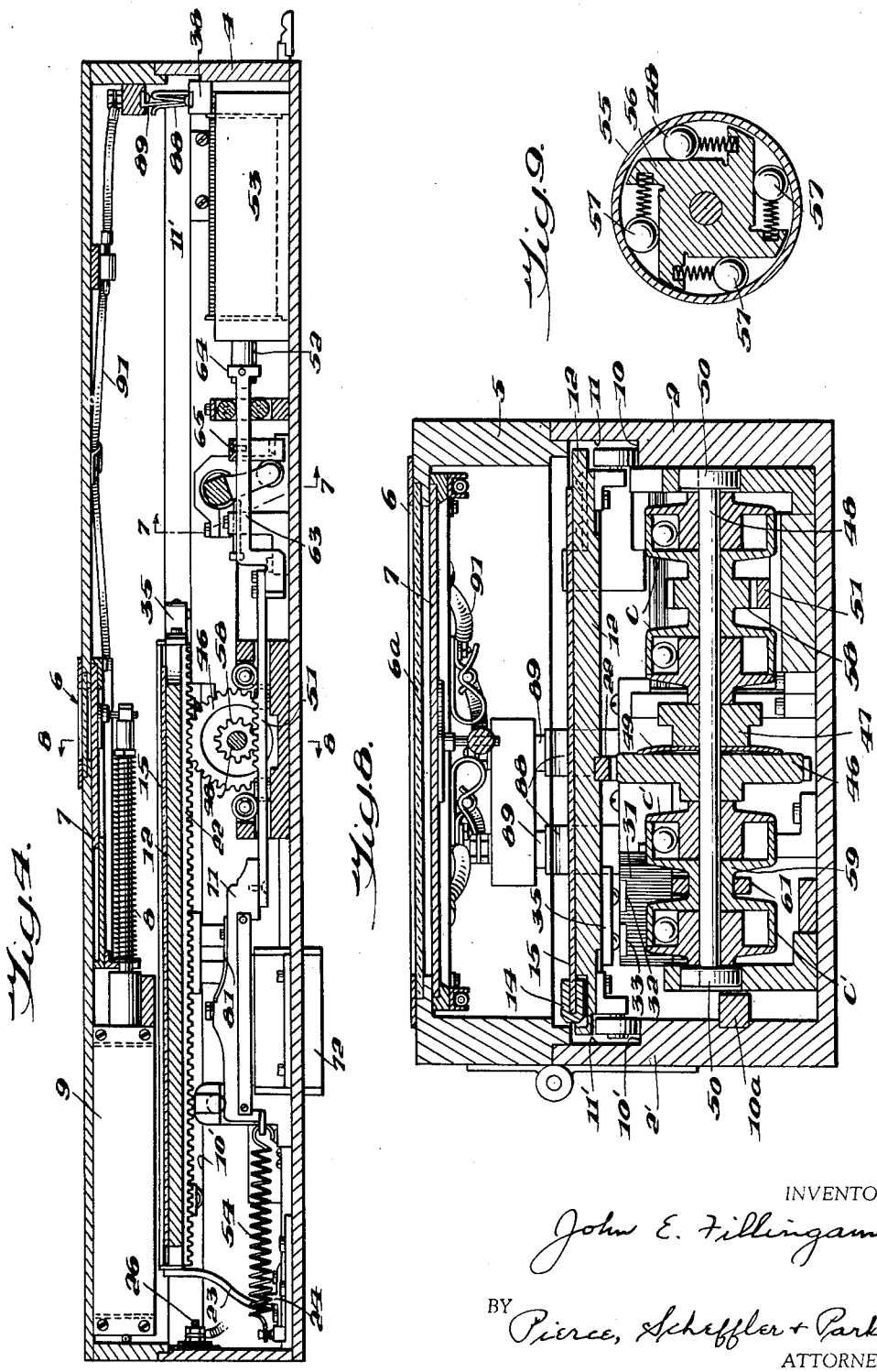

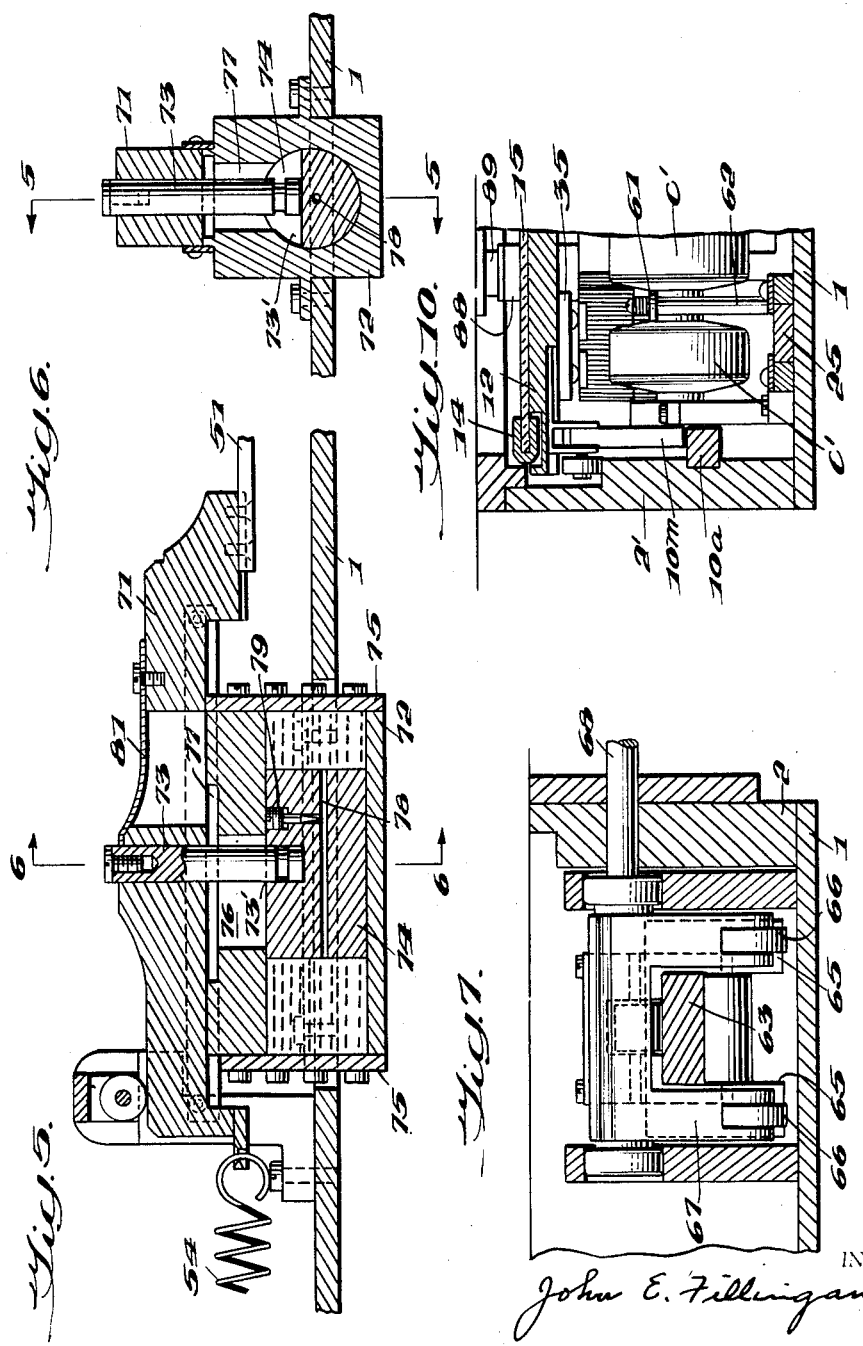

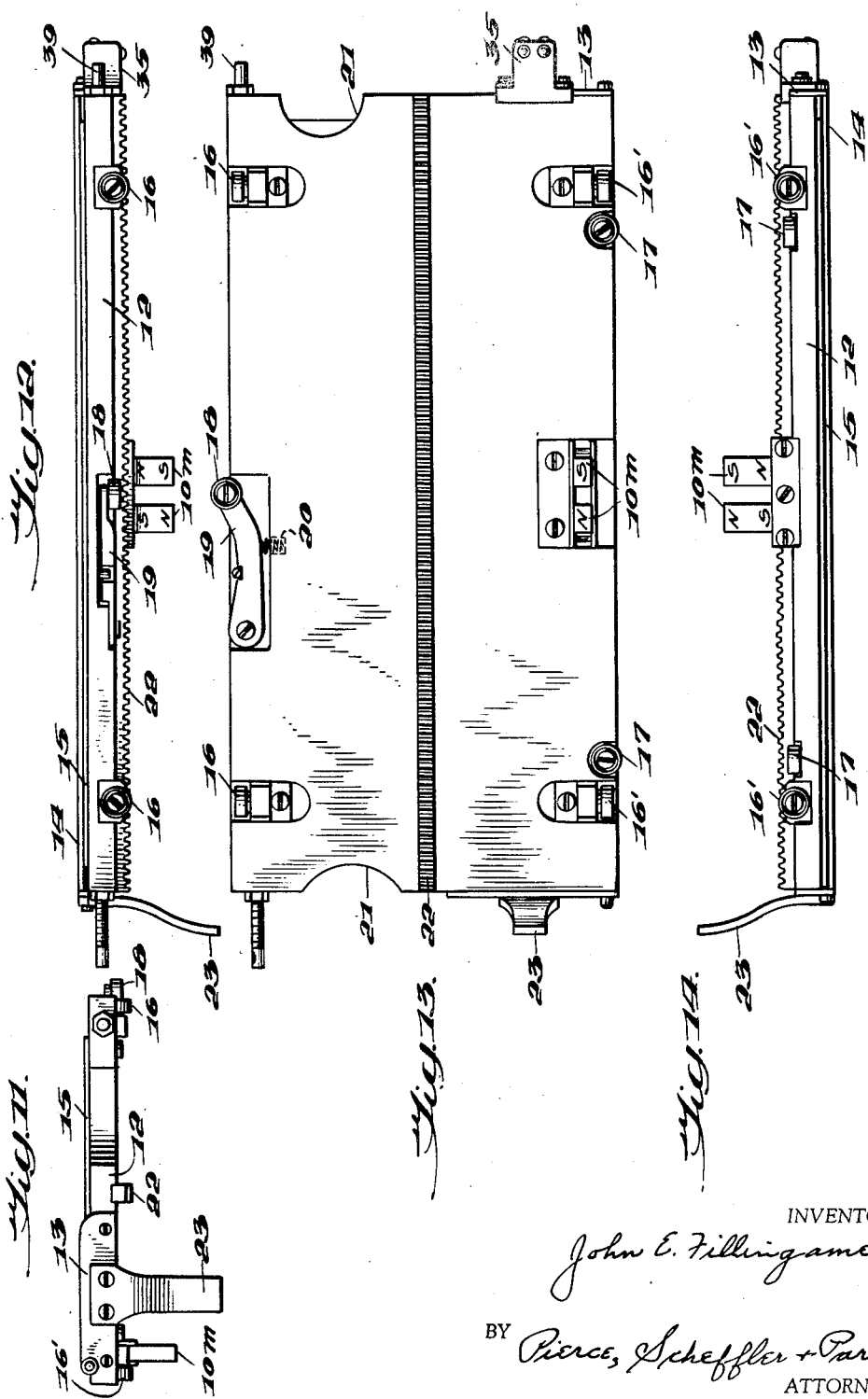

Feb. 19, 1957  J. E. FILLINGAME  2,781,690
FILM BOX FOR PHOTOGRAPHIC CAMERAS
Filed April 29, 1954  6 Sheets-Sheet 6

INVENTOR:-
John E. Fillingame,

BY Pierce, Scheffler & Parker
ATTORNEYS

United States Patent Office 2,781,690
Patented Feb. 19, 1957

2,781,690

FILM BOX FOR PHOTOGRAPHIC CAMERAS

John E. Fillingame, Washington, D. C., assignor to National Geographic Society, Washington, D. C., a corporation of the District of Columbia Application April 29, 1954, Serial No. 426,446

8 Claims. (Cl. 88—24)

This invention relates to a film box for photographic cameras, more particularly to a film box as described in Patent No. 2,555,631, George Newman Bumstead, Box for Sensitized Medium Used in Photographic Reproduction.

The film box is provided with a shutter opening and is adapted to be moved into the camera to position the shuttered opening in the path of the image formed by the camera, and it provides a movable support for a strip of film or of other sensitized medium upon which a plurality of exposures are to be made in sequence.

An object of the invention is to provide a film box which includes a carriage for supporting the film in flat planar position in preselected relation to the shutter opening.

Another object is to provide a film box which includes mechanism for advancing the film carriage in a precisely linear path after successive exposures.

Another object is to provide a film box which includes elements of a signal system for indicating, at a remote point, the relative amount of film remaining for exposure.

These and other objects and the advantages of the invention will be apparent from the following specification when taken with the accompanying drawings in which:

Fig. 1 is a plan view of a film box embodying the invention, the hinged cover of the box being in fully open position and the film carriage in its initial position;

Fig. 2 is a plan view of the interior of the box, with the film carriage removed to show the carriage feed mechanism;

Fig. 3 is a fragmentary side elevation of the film box;

Fig. 4 is a longitudinal vertical section substantially on line 4—4 of Fig. 2 but showing the film box closed;

Fig. 5 is a central vertical section on line 5—5 of Fig. 6, through the damping device of the carriage feed mechanism;

Fig. 6 is a transverse vertical section through the same on line 6—6 of Fig. 5;

Fig. 7 is a transverse section, on an enlarged scale, on line 7—7 of Fig. 4;

Fig. 8 is a transverse vertical section on line 8—8 of Fig. 4;

Fig. 9 is a central section through one of the one-way ball clutches of the carriage feed mechanism;

Fig. 10 is a fragmentary vertical section on line 10—10 of Fig. 1;

Fig. 11 is an end elevation of the film carriage;

Fig. 12 is an elevation of the same as seen from the opening side of the film box;

Figs. 13 and 14 are, respectively, a bottom plan view of the film carriage and an elevation of the same as seen from the other side when inverted;

Figure 15:
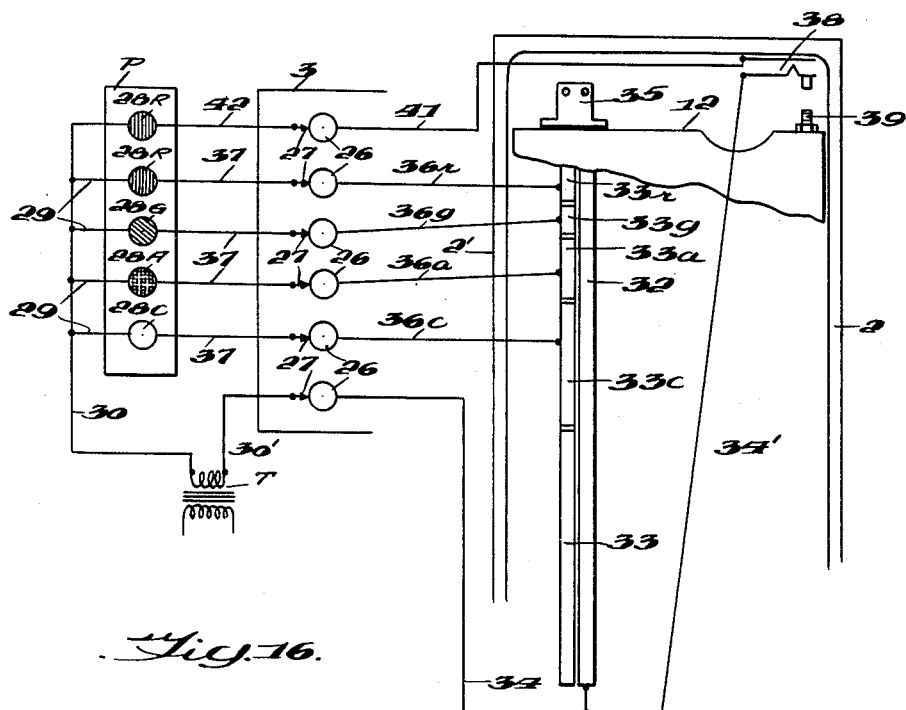
Fig. 15 is a wiring diagram of the system for indicating the amount of film remaining for exposure.

In the drawings, the numeral 1 identifies the bottom wall of a rectangular metal box having side walls 2, 2', a front wall 3 and a rear wall 4. The cover 5 is hinged to the side wall 2' and provided with a shutter opening 6 which is covered by a glass 6a and houses a shutter 7 that is normally held in closed position by a spring 8 and may be opened by the solenoid 9. The upper portions of the side walls 2, 2' are rabbeted to provide parallel horizontal rails 10, 10', respectively, and vertical rails 11, 11' which extend above the horizontal rails. As is best shown in Figs. 11 to 14, a carriage for holding a sheet of cut film F comprises a rigid metal base plate 12 having small strips 13 extending above the ends thereof to support a hinge strip 14 to which a cover plate of glass 15 is secured. Roller bearing wheels 16 and 16' are secured to the lower face of the plate 12 to support the carriage for movement on the rails 10, 10', respectively, and a pair of roller bearing guide wheels 17 are mounted at the hinged side of the carriage for engagement with the vertical rail 11'. A single roller bearing guide wheel 18 is mounted beneath the opposite side of the plate 12 on a lever 19 which is urged outwardly by a spring 20 to engage the wheel 18 with the vertical rail 11 and thus press the carriage toward the opposite vertical rail 11'.

A horizontally extending rail 10a (see Fig. 10), is set into the side 2' of the box beneath and parallel to the rail 10', and a pair of bar type permanent magnets 10m are secured to the lower face of the carriage plate 12 to hold the film carriage supporting wheels 16' to track 10' by magnetic attraction. The ends of the magnets 10m do not contact the rail 10a but are spaced above it by a slight clearance.

Notches 21 are cut in the ends of the carriage plate 12 to facilitate the lifting of the cover glass 15 and for convenience in grasping the film between the thumb and fingers to press it diagonally, as indicated by arrows a, toward the hinge strip 14 and one of the small hinge plates 13 to position the film accurately in preselected position on the carriage. A rack bar 22 is secured to the lower face of the carriage plate 12 and constitutes a part of the film feed mechanism which will be described later.

The film carriage is initially at the forward end of the film box, and it is moved rearwardly after each exposure. An arm 23 extends downwardly from the front end of the film carriage to project into the path of movement of a lug 24 on a slide 25 which extends through the rear end wall 4 of the box and is normally resiliently trapped by a camera part, not shown, so that it moves rearwardly of the film box as the latter moves into its forward operative position. On return movement of the film box into the dark room, the resulting relative movement of the slide with respect to the film box returns the film carriage to its initial position.

A signal system which affords an indication of the travel of the film carriage, and thereby of the amount of unexposed film, is shown diagrammatically in Fig. 15. The system is energized by the 6–8 volt secondary winding of a step-down transformer T, and the connections to the circuit elements within the box include terminal plugs 26 which extend through and are insulated from the front wall 3 of the box and cooperating spring contacts, shown schematically as arrows 27, which are mounted on the camera in position to engage the contacts 26 when the film box is in forward operative position. The indicating elements are small lamp bulbs back of the differently colored lenses 28 of a panel P which is mounted on the camera or on a desk in convenient view of the operator, one terminal of each lamp bulb being connected by a jumper 29 to a lead 30 which extends to one side of the transformer secondary winding. As indicated by the hatching and by the letters R, G, A and C, the upper lenses are red, red, green and amber, respectively, and the lower lens is of clear glass. The elements within the film box include a pair of parallel conductor rails inset in a strip 31 of insulating material and thereby insulated from each other, one conductor rail 32 extending the full length of travel of the film carriage and the other conductor rail comprising sections 33, 33c, 33a, 33g and 33r, which are insulated from each other. The second terminal of the transformer secondary is connected by a lead 30', a spring terminal 27 and a terminal plug 26 to the conductor 34 which extends to the longer contact rail 32 within the film box. A metal block 35 is secured to and insulated from the rear end of the film carriage plate 12 to act as a switch bar between the respective conductor rails. No connection is made to the long section 33 of the second conductor rail, but leads 36c, 36a, 36g and 36r extend from the remaining segments of the second conductor to terminal plugs 26. The lamp bulb circuits are completed by wires 37 from the second terminals of the several bulbs to the spring terminals 27 which engage those contacts 26 which are connected to sections of the second conductor rail. The four lower lights on the panel P are lighted in succession as the film carriage moves rearwardly and displaces the jumper 35 to connect the several segments of the second conductor rail in succession to the long conductor rail 32. In the particular embodiment which is here illustrated, the segments 33g and 33r each have a length of ½ inch, whereby the initial energization of the lamp bulb back of the green lens 28 indicated that one inch of film remained for exposure and the initial energization of the lamp bulb back of the first red lens 28 indicated that only ½ inch of the film remained for exposure.

Complete exposure of the film sheet is indicated by the lamp back of the second red lens 28, the energizing circuit for this lamp bulb including the lead 34, and lead 34' to the blade of switch 38 which is closed by a screw 39 set in the end of the film carriage plate 12 when the film carriage is in extreme rearward position, a lead 41 from the fixed contact of switch 38 to the upper terminal plug 26, and a lead 42 from the associated spring terminal 27 to the lamp bulb beneath the upper (second) red lens 28R.

The film carriage plate 12 is driven through one-way clutches in substantially the same manner as the film feed roll 70 of Bumstead 2,555,631 except that four one-way clutches are provided for greater mechanical stability. A drive gear 46 meshes with the rack 22 on the lower side of plate 12 and is frictionally coupled to a collar 47 on a shaft 48 by a spring washer 49. The shaft extends through the gear 46 and is supported in end bearings 50. Motion is derived from a rack bar 51 which is coupled to, and moved towards the right, as viewed in Fig. 4, by the plunger 52 of a solenoid 53. The clutches are so arranged that movement of the rack bar by the solenoid does not result in movement of the film carriage, the solenoid merely setting the mechanism in condition for movement of the film carriage when the rack bar is moved in the opposite direction by a helical spring 54 on de-energization of the solenoid 53.

The one-way clutches may be, and preferably are, of the type shown in the Bumstead patent and comprise an outer shell or drum 55, an interior cam member 56 secured to the shaft 48, and a series of balls 57 which jam between the drum and the cam member of the clutch on relative rotation of the same in one direction and which will roll free to uncouple the clutch members on relative movement of the parts in the opposite direction. The clutches C, C constitute the drive for the film carriage, and the clutches C', C' prevent backward movement of the film carriage.

The drums 55 of the drive clutches C, C are connected to each other by a gear 58 which is in mesh with the rack bar 51 and loosely journalled on the shaft 48. The drums of the clutches C', C' which block reverse movement of the film carriage are similarly connected by a sleeve 59 which is anchored against rotation, for example by a clamp 61 carried by a post 62 secured to the bottom wall of the film box. With duplicate clutches of the type including four spring-pressed balls, as shown in Fig. 9, for driving and for blocking retrograde motion of the film carriage, there is no slippage in the drive of the film carriage and no inadvertent backward movement.

The plunger 52 enters fully into the solenoid 53 at each energization of the latter, and thus move the rack bar 51 to its extreme right position to set the mechanism for a measured advance of the film carriage 12 by spring 54 upon de-energization of the solenoid 53. It will be noted that the axis of the helical spring 54 alines with the axis of the plunger 52 of solenoid 53, and that an extension of the axis would pass through the meshing teeth of rack 51 and gear 58, thus avoiding an unbalance of the forces which actuate the rack 51 and shaft 48.

The rack bar 51 is connected to a strap 63 which has a universal joint connection 64 to the plunger 52 of the solenoid 53, and the rack is guided for rectilinear movement by a plurality of rollers, not separately identified by reference numerals. The mechanism for limiting the film feed movement comprises a yoke 65 secured to the strap 63 and having depending legs which engage rollers 66 in the ends of crank arms 67 mounted on a rock shaft 68 which extends through the wall 2 of the film box and carries a lever 69 which rides upon an adjustable lever, not shown, of the camera in which the film box is to be employed. The rack bar 51 extends beyond the gear 58 and has secured thereto a strap 71 which slides upon the top wall of a damping cylinder 72 and has a post 73 secured therein which extends into and snugly fits in a slot 73' which is milled across the damping piston 74. The damping cylinder is preferably a rectangular block of metal having a cylindrical bore therethrough which is closed at each end by an attached plate 75. The top wall of the cylinder block is provided with an opening 76 in which the post 73 slides and which has end surfaces limiting the range of movement of the post 73. The opening 76 is flared at its top to provide a reservoir 77 for the oil or other fluid employed for damping the movement of the piston 74 which is honed to fit snugly within the cylinder so that there will be no leakage of fluid around the piston as it moves in either direction within the cylinder.

The piston 74 has an axial opening 78 therethrough for the flow of the damping fluid from one end of the cylinder to the other upon movement of the piston 74. The effective size of this opening may be regulated by a needle valve 79 which is threaded into the piston 74, access to the needle valve 79 being had upon removal of a cover plate 81 which extends over an opening in the strap 71 to afford access to the reservoir 77. The strap 71 is arched to extend above the cylinder 74 in such manner that the resultant of the forces exerted upon the rack bar 51 by the solenoid 53 and the spring 54 pass substantially through the axis of the damping piston 74.

The needle valve 79 is adjusted to restrict the flow of fluid through the passage 78 so that the displacement of the piston 74 and the rack bar 51 by both the solenoid 53 and the spring 54 takes place slowly and without shock which might disturb the intended action of the one-way clutches C, C and C', C'. The damping system has the advantage over conventional damping cylinders in which the piston is mounted upon a rod that extends through the ends of the cylinder in that there is no difficulty from leakage of fluid from the cylinder or of air into the cylinder. Gaskets and/or cement may be employed to seal the heads 75 to the cylinder block 72 and the only opening into the cylinder is through the slot 76 and reservoir 77 which are at least partially filled with the damping fluid at all times.

Figure 16:
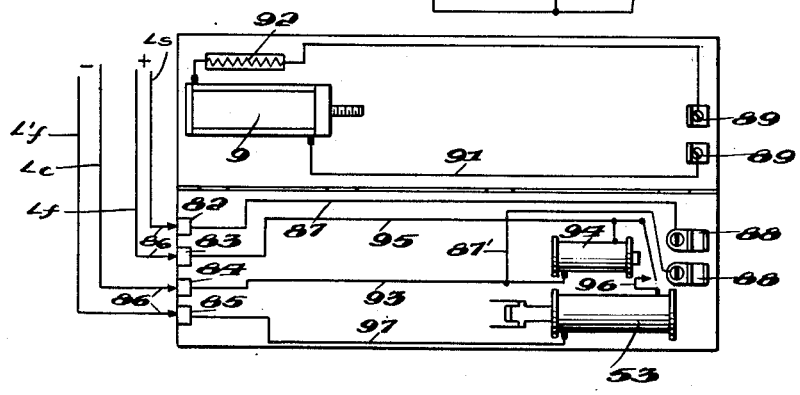
Fig. 16 is a wiring diagram of the circuits for controlling the shutter and the carriage feed mechanism.

The circuit connections for energizing the shutter solenoid 9 and the film-feed solenoid 53 are shown schematically in Fig. 16. Terminal plugs 82—85 are mounted in and insulated from the front wall 3 of the film box and are engaged by spring contacts on the camera when the film box is in forward, operative position, the spring contacts being illustrated schematically by the arrows 86. Terminal 82 is engaged by the spring contact of the positive lead L*s* of the shutter control system of the camera in which the film box is employed, and is connected by a lead 87 to a clip 88 which is mounted in fixed position within the box for engagement by a terminal 89 of the shutter-operating circuit 91 when the cover of the box is closed. The shutter-operating circuit 91 preferably includes an adjustable voltage-dropping resistor 92 of preselected value in series with the solenoid 9, and the second terminal 89 of the shutter-operating circuit 91 engages a second fixed clip 88 on the box when the cover is closed. The second clip 88 is returned by a jumper 87' and lead 93 to the terminal 84 that is connected by a spring contact 86 to a common negative lead L*c* of the camera control system. Terminal 83 is engaged by the spring contact of the positive lead L*f* of the camera circuit for energizing the film-feed solenoid 53, and is connected to a relay 94 and to the movable blade of the relay contacts by a lead 95. The solenoid 53 is connected between the front contact of relay 94 and terminal 85 by a jumper 96 and a return lead 97, the terminal 85 being engaged by the spring contact 86 of the return lead L'*f* of the camera control circuit for the film feed.

As explained in my copending application Ser. No. 444,498, filed July 20, 1954, the camera circuits may simultaneously energize the shutter solenoid 9 and the relay 94 or may selectively energize these elements. When simultaneously energized, the relay 94 pulls in at once to energize the solenoid 53 to set the film-feeding mechanism for an advance of the carriage 12 when the solenoid 53 is de-energized. The relay 94 is of the slow-opening type and maintains the energization of the solenoid 53 for a sufficient period to permit the closing of the shutter 7 before the solenoid 53 is de-energized. On de-energization of solenoid 53, the spring 54 moves the rack bar 51 the measured distance determined by the setting of the crank arms 67 by lever 69.

Alternatively, only the feed control circuit may be closed independently of the shutter control circuit to energize only the relay 94 and solenoid 53. This operation is desirable to permit adjustment of the film-feed control elements of the camera, not shown, for adjustment of the step advance of the film carriage without effecting an actual but inadvertent displacement of the film carriage during the adjustment of the extent of the next desired movement of the film carriage.

I claim:

1. For use in a camera, a film-containing box having an aperture through one wall thereof, a shutter, means for actuating said shutter to expose a portion of the film, and means for feeding the film in sequential steps past said aperture; said feeding means comprising a bed plate for supporting the film, a transparent cover plate hinged to said bed plate for maintaining the film in planar condition on said bed plate, wheels secured to said bed plate and forming therewith a movable carriage, and rails rigidly secured to said box to constitute tracks for said carriage.

2. The invention as recited in claim 1, wherein said wheels include supporting wheels on horizontal axes and guide wheels on vertical axes, and said rails include horizontally arranged surfaces on which said supporting wheels travel and vertical surfaces cooperating with said guide wheels.

3. The invention as recited in claim 2, wherein two guide wheels are provided at opposite ends of one side of said bed plate, a single guide wheel is provided at a midpoint of the opposite side of said bed plate, and a spring-pressed arm supporting said single guide wheel.

4. The invention as recited in claim 2, in combination with a rail of ferrous material having a horizontal surface and permanent magnet means attached to said bed plate to draw said bed plate towards said ferrous material track to hold said supporting wheels to the associated rails.

5. The invention as recited in claim 1, wherein said feeding means includes a rack bar secured to the bottom of said bed plate, a gear in mesh with said rack bar, a shaft supporting said gear, one-way clutch means on said shaft, a reciprocating drive member for said one-way clutch means, a spring for moving said drive member in that direction which engages said one-way clutch means to actuate said shaft, a solenoid for moving said member in the opposite direction, and means adjustable to limit the movement of said member by said spring; said one-way clutch means comprising a gear meshing with a rack on said reciprocating member, and a one-way clutch on each end of said last-mentioned gear.

6. The invention as recited in claim 5, wherein said solenoid comprises an operating coil and a reciprocating plunger, and the meshing teeth of the second gear and the rack of said moving member are in substantial alinement with the axis of said plunger, in combination with a damping cylinder axially alined with said plunger, a piston in said damping cylinder, and means connecting said movable member to said piston.

7. The invention as recited in claim 1 wherein said shutter actuating means comprises a solenoid having a plunger connected to said shutter for opening the same, and a spring for reclosing said shutter, said film-feeding means including a spring means for moving said carriage, a solenoid and plunger for stressing said spring means, in combination with a current source, and circuit elements forming independent circuits to connect said current source to the respective solenoids.

8. The invention as recited in claim 7, wherein the circuit elements of the circuit of the solenoid of the film feeding means include a relay having a delayed-opening characteristic and a front contact included in the energizing circuit of the film feeding solenoid, whereby simultaneous energization of said independent circuits effects a simultaneous energization of both said solenoids whereas simultaneous de-energization of said circuits effects an immediate closing of said shutter and a time-delayed movement of said carriage by said spring means.

References Cited in the file of this patent

UNITED STATES PATENTS

| | | |
|---|---|---|
| 2,019,764 | Ogden | Nov. 5, 1935 |
| 2,172,283 | Kirby | Sept. 5, 1939 |
| 2,184,222 | Koppe | Dec. 19, 1939 |
| 2,555,631 | Bumstead | June 5, 1951 |